United States Patent
Weakly et al.

(10) Patent No.: US 6,267,871 B1
(45) Date of Patent: Jul. 31, 2001

(54) APPARATUS AND PROCESS FOR RECOVERING METALS FROM AQUEOUS SOLUTIONS

(76) Inventors: Edward C. Weakly, P.O. Box 543, Morrison, CO (US) 80465; Henry L. DiCamillo, RRT 10 Box 480, Glenwood, NM (US) 88039

(*) Notice: Subject to any disclaimer, the term of this patent is extended or adjusted under 35 U.S.C. 154(b) by 0 days.

(21) Appl. No.: 09/248,064

(22) Filed: Feb. 10, 1999

(51) Int. Cl.$^7$ ..................................... C02F 1/461
(52) U.S. Cl. .................. 205/742; 205/751; 204/275; 210/748
(58) Field of Search .................. 205/742, 751; 204/275; 210/748

(56) References Cited

U.S. PATENT DOCUMENTS

| | | | |
|---|---|---|---|
| 3,744,995 | 7/1973 | Mackay | 75/109 |
| 3,977,865 | 8/1976 | Owen | 75/11 |
| 4,014,766 | 3/1977 | Wantanabe et al. | 204/152 |
| 4,149,953 | 4/1979 | Rojo | 204/269 |
| 4,303,441 | 12/1981 | Lamisse | 75/109 |
| 4,382,866 | 5/1983 | Johnson | 210/748 |
| 4,552,664 | 11/1985 | Benner | 210/695 |
| 4,578,112 | 3/1986 | Mori et al. | 75/108 |
| 4,594,215 | 6/1986 | Panson et al. | 376/315 |
| 4,645,607 | 2/1987 | Divisek et al. | 210/719 |
| 5,089,145 | 2/1992 | Fern | 210/748 |
| 5,458,024 | 10/1995 | Schiller et al. | 75/713 |
| 5,616,250 | 4/1997 | Johnson et al. | 210/695 |
| 5,728,303 | 3/1998 | Johnson | 210/695 |
| 5,868,919 | 2/1999 | Babington et al. | 205/688 |
| 5,993,668 | 11/1999 | Duan | 210/713 |

OTHER PUBLICATIONS

Dalrymple, C.W., Use of Electrocoagulation for Removal of Heavy Metals in Industrial Wastewaters, *Treatment and Minimizations of Heavy Metal–containing Wastes*, Edited by Hager, Mishra, Davidson, & Litz, The Minerals, Metals & Materials Society, 1995. No month available.

Promotional Article entitled "Electro–Flocculator", Environmental Tekniks, Inc., Paris, Texas, 1997, (10 pages). No month available.

*Primary Examiner*—K. Mayekar
(74) *Attorney, Agent, or Firm*—James R. Young; Chrisman, Bynum & Johnson

(57) ABSTRACT

A system and process for removing metal from a directed flow of an aqueous solution by exposing the directed flow to a high voltage electrical field in the direction of the directed flow. In one embodiment, seven electrode chambers are provided, each connected in fluid communication end-to-end, and each having an electrode encapsulated by a layer of an electrically insulating material. Either DC or AC (preferably 60 Hertz) current may be used. Each electrode is surrounded by a grounded stainless steel lined PVC hollow tube, and a flow passageway is formed between the inner wall of the hollow tube and the outer layer of insulating material. The aqueous solution flows through the flow passageway, thereby being exposed to the high voltage electrical field adjacent to the electrode. The flow is directed into two tubular secondary grounds. Each ground is connected in flow communication end-to-end and has a quantity of stainless steel wool through which the flow is directed. The stainless steel wool is connected to ground. As the aqueous solution flows through the stainless steel wool, the metallic ions and colloidal metal, having a positive charge, are separated as native elements which are attracted to the carbon and resin filters. Very little current flows between the electrodes and the stainless steel wool, typically two milliamps. The stainless steel wool is periodically removed and cleaned or may be further processed to remove the metals which plate on the stainless steel wool.

15 Claims, 9 Drawing Sheets

APPARATUS AND PROCESS FOR RECOVERING METALS FROM AQUEOUS SOLUTIONS

BACKGROUND OF THE INVENTION

1. Field of the Invention

The present invention relates to the recovery of metals from aqueous solutions, and more particularly to the field of recovery of base and precious metals from ground water, surface water, domestic and public water, from mines, industrial metals plants discharge and plating industry.

2. Statement of the Problem

Metals are typically slightly soluble in water. In many instances it is desirable to remove metal from aqueous solutions. For example, in producing drinking water, it is desirable to remove metals because of the health risks associated with certain metals. Removing certain metals from industrial waste before disposing into the environment may be required by regulation. Obviously, where significant volumes of aqueous solutions containing precious metals, such as gold or silver, are available, it is desirable to remove these metals for their intrinsic value. Gold is increasingly being used in the semiconductor industry. As aqueous wash solutions replace harsher, fluorine-based wash solutions, the semiconductor industry may become a source of significant volumes of gold-bearing aqueous solutions. Groundwater in regions containing gold-bearing ores often contain small concentrations of gold. One of the greatest sources of large volumes of water containing small concentrations of metals, and particularly precious metals, is mines.

Throughout the world there are many subterranean gold and silver mines that were once prosperous but have been closed or abandoned because their yields ceased to justify large scale commercial mining. Nevertheless, quantities of gold, silver, and other heavy metals remain in the ores surrounding the mines, although perhaps not in sufficient concentrations to warrant commercial mining. When subterranean mines are closed or abandoned, ground water often collects in the mine shafts. Water, as it flows from the surface into the earth through the various rocks surrounding the mine, dissolves metals from the ores. There are many abandoned mine shafts containing significant quantities of water with dissolved metals in solution although the concentrations are low, often 50 parts per million ("ppm")or less. However, no commercially available process exists to economically remove the dissolved metals from the water.

There are many known processes for removing metals from an aqueous solution. However, these known processes become very inefficient and cease to be cost effective at such low concentrations.

One such process, electrowinning, has long been used in conjunction with heap leach-carbon adsorption methods for gold and silver mining. In the context of the recovery of gold (although this process can be varied to recover both gold and silver), a low grade ore is formed into a heap. A dilute alkaline cyanide solution (although other solutions are also used) is sprayed on the heap and allowed to flow through the heap to a recovery point. The alkaline cyanide solution recovered contains molecular gold, and this solution is referred to as the "pregnant solution." One highly favored method of recovering gold from the pregnant solution is carbon stripping. In carbon stripping, the pregnant solution is passed through activated carbon, which adsorbs the gold. Various methods are available for "desorption" of gold from the activated carbon. A well known method is to leach the carbon with an aqueous solution of sodium hydroxide and sodium cyanide to remove the gold from the activated carbon. This stripping solution is then passed through one or more electrolytic cells in the process known as "electrowinning."

Electrowinning is a direct current (DC) electrolytic process involving low voltage and high current. An electrowinning cell consists of an anode, a cathode, and a corrosion-resistant container. As current is passed through a cell, gold and other metals are removed from the solution and deposited at the cathode. One popular cell design, the "Zandra" cell, consists of three containers nested inside one another. (Other cell designs are know; See, e.g., David A. Milligan, et al., *Introduction to Evaluation, Design, and Operation of Heap Leaching Projects*, 137–151 (Dirk van Zyl ed. 1988)). The inner container is perforated and serves as the cathode compartment in which is placed a feed tube and a quantity of stainless steel wool, which, being grounded, functions as a cathode. The second outer steel container surrounding the cathode is the anode. The third outer container functions as an overflow container. The metal-bearing stripping solution is introduced into the first container through the feed tube, and flows up through the steel wool cathode to overflow the first container into the second, and then overflows the second into the third where it is then removed and recirculated. (See, e.g., J. B. Zandra, et al., *Process for Recovering Gold and Silver From Activated Carbon by Leaching and Electrolysis*, U.S. Bureau of Mines Report of Investigations 4843 (1952)). The stripping solution typically has a concentration of 50 to 2,000 ppm of gold, although it may assay as high as 3500 p.m. However, the efficiency decreases dramatically with a decrease in concentration, with 100% efficiency at 2000 ppm to zero efficiency at 1 ppm (See Milligan at 145). The power required for electrowinning is determined by cell voltage and current. Typically, 2–3 volts are used, with current depending on the size of the cell.

In a typical commercial operation (as set forth in D. M. Duncan, T. J. Smith, *How Cortez Gold Mines Heap-Leached Low Grade Ores at Two Nevada Properties*, E/MJ July 1977) at a flow rate of 13 GPM of a stripping solution, an electrowinning cell containing nine cathodes consumed 190 amps at 2.5 volts. Where the feed solution had a concentration of 0.7 oz. gold/ton (24 ppm), the discharge from the cell contained 0.07 oz. gold/ton (2.4 ppm). Hence, 475 watts were consumed to treat 13 GPM to recover 21.6 ppm., or 90% of the gold in the solution. Besides the cost of electricity, this process obviously includes other high overhead and operational cost, such as the cost of forming the heap, washing the heap with the leaching solution, pumping the leaching solution through a carbon stack, and washing the carbon with the stripping solution.

It should be kept in mind that the above data are for a process using a caustic solution, which has a much higher conductivity than groundwater containing low concentrations of metals. When there are no electrolytes present except for dissolved metallic ions, the resistance of the aqueous solution is much greater, so higher voltages are required to obtain the high current flow on which the electrowinning process depends. Since the groundwater in mines is essentially pure, it would be undesirable to add harsh, environmentally dangerous electrolytes (such as sodium hydroxide) to enhance conductivity as doing so would only create a waste disposal problem that would further add to the cost of recovery. The above example from the Cortez mine is illustrative of the electrical energy consumption where a highly conductive electrolyte is present. However, groundwater from mines typically does not have a high conductivity, as the harsh electrolytes used in the Cortez mining operation are not present. When the electrowinning process is used with substantially pure water containing low concentrations of metals, the voltage required to attain the current flow required by electrowinning to accomplish plating increases dramatically, with as much as 150 or even 300 volts required. Hence, power consumption is also dramatically increased (with 150 volts and 25 amps constituting 3,750 watts). Furthermore (as stated by Milligan at 145), the efficiency of the electrowinning process approaches zero at concentrations of gold less than 1 ppm.

When considering the low efficiency at low concentrations, the high power consumption (both at the electrodes and in converting AC voltage to DC voltage), and the cost of electrical power, the electrowinning process is not economically feasible where concentrations of gold and the conductivity of the solution are low. Thus, what is needed is an apparatus and a process to remove metals, including precious metals such as gold, from water having low concentrations (such as 50 ppm to 0.008 ppm) that are highly efficient at such low concentrations, removing the majority of gold while consuming little electrical power and also having low capital and operating costs.

3. Solution to the Problem

The present invention provides a novel solution to the aforementioned problems by providing a cost effective system and process for removing precious metals (gold and silver), and other base metals from aqueous solutions having low concentrations of these metals. The present invention consumes little electrical power to treat a relatively high flow of water containing as little as 2 parts per billion for gold yet removing 97% of the gold and removing 90% to 100% of such metals as iron, aluminum, lead, arsenic, cadmium, zinc, etc. This invention can be used with either direct or alternating current, although alternating current is preferred since conversion of readily available alternating current to direct current would involve a needless expense and energy loss. This invention does not require the use or addition of any harsh chemical additives to increase the conductivity of the water since it does not rely on high current flow. Since electrolytic additives are not required, when treating groundwater from mines, the water can often be deposited without any further treatment directly into the environment. Furthermore, the apparatus of this invention can be inexpensively built using components available at most local hardware stores, and can be assembled on the back of a small trailer, allowing it to be easily transported between remote locations.

The present invention includes, in one embodiment, a system having seven cylindrical electrodes, each connected to a high voltage power source (preferably 10,000 VAC). Each electrode is enclosed in a grounded stainless steel tube inside a plastic tube through which metal bearing water is passed, and the tubes are connected end-to-end. Each electrode is electrically insulated and sealed from the water to minimize the electrical current flowing through the system. After flowing past the electrodes and the ground, the water flows through at least one collector (two in the preferred embodiment), each having a quantity in one manganese dioxide and in the other carbon. Molecular, micron, ionic, as well as colloidal gold and other metals are deposited onto these filters after passing through the electrical field generated between the electrode and ground. Particles larger than colloidal gold may also be filtered out by the filter tanks or may settle out in a settling tank (an optional accessory to the present invention) after the water passes through the collectors. Typically, in a system using seven such electrodes in series and two collectors, the current flow is approximately 23 milliamps. The filters are granulated iron-grabbing resin, granulated carbon, and as a final filter at least minus 30 to 70 mesh clean quartz sand.

SUMMARY OF THE INVENTION

The present invention provides an apparatus and process to economically and efficiently recover either a single metal or several metals (depending on the contents of the aqueous solution) from an aqueous solution having low concentrations of such metals. The present invention is particularly well suited to the removal of gold, silver, selenium, uranium and all base metals, including iron manganese, zinc, chromium, aluminum, arsenic, cadmium, vanadium, lead, and mercury.

The present invention provides a system for removing metal from a directed flow of an aqueous solution by exposing the directed flow to a high voltage electrical field in the direction of the directed flow by a means of exposing the flow to a high positive voltage electrode and a grounded electrode. Collecting the metal from the flow after passing between the ground and the electrode. The collectors are commonly available filter materials.

In the preferred embodiment of the system of this invention, seven electrode chambers are provided, each connected in fluid communication end-to-end, and each having an electrode encapsulated by a layer of water-tight electrically insulating material. The electrically insulating material, in the preferred embodiment, also seals the electrode to prevent contact with the aqueous solution. This electrode is connected to a high voltage power source, typically an ignition step-up transformer or series of transformers fed by either a utility power line or a portable generator to provide high voltage such as 10,000 volts AC. The present invention may be used with either DC or AC (standard 115 volt household stepped up to high voltage) current. Alternating current is preferred since conversion of readily available alternating current to direct current would involve a needless expense and energy loss and because alternating current is more easily stepped up to the high voltage required than direct current.

Each electrode is surrounded by a hollow tube of grounded stainless steel, and a flow passageway is formed between the inner wall of the hollow tube and the outer layer of insulating material. These are placed inside plastic tubes for convenience and safety. The aqueous solution flows through the flow passageway, thereby being exposed to the high voltage electrical field between the electrode and the ground.

After passing through the seven electrode chambers, the flow is directed into (in the preferred embodiment) and one or two filter tanks. In the filters only carbon is required but resin and sand are useful, depending upon the objective and metals to be removed.

The preferred embodiment of the process of the present invention includes the step of providing a high voltage power source and a substantially insulated electrode connected to the high voltage power source. A grounded electrode to initiate the collection of the metal is provided, and the grounded electrode is in flow communication with the substantially insulated electrode. The aqueous solution is exposed to a high voltage field by passing in close proximity to the substantially insulated electrode connected to the high voltage power source. Then, the solution is passed through electrode filters after flowing between the grounded electrode and the insulated electrode.

Hence, an apparatus and process for recovering metals from aqueous solutions is provided that consumes little electrical power yet is highly efficient even at low concentrations. Many other embodiments are included within the claims of the present invention, several of which are discussed below. Numerous other features, objects, and advantages of the invention will be apparent from the following description when read together with the accompanying drawings.

BRIEF DESCRIPTION OF THE DRAWINGS

The present invention can be more readily understood in conjunction with the accompanying drawings in which.

DETAILED DESCRIPTION OF THE INVENTION

1. Definitions

The following definitions are used herein:

"Metal" shall mean any of a class of chemical elements, such as iron, silver, gold, aluminum, platinum, etc. Chemically, a metal can be classed as an element that will combine with oxygen and hydrogen to form a base.

"Colloidal" when used in reference to a particular metal, such as "colloidal gold", shall refer to particles of that particular metal suspended in a medium, the particles having dimensions greater than atomic or molecular dimensions, but sufficiently small to exhibit continuous agitation in solution as a result of unbalanced impacts with molecules of the surrounding medium.

"Ionic", when used in reference to a particular metal, such as "ionic gold", shall be used to mean an electrically-charged atom or group of atoms of that particular metal, and the charge will be positive. "Ion" refers to an electrically-charged atom or group of atoms, and "metallic ions" refers to ions of a particular metal.

"Native" when used in reference to a particular metal, such as "native gold", refers to the crystalline form of that particular metal such as occurs in nature.

"Volts" and "amps", when preceded by a certain value and when used in referring to alternating voltage or current or an alternating power supply, shall mean the root-mean-square value ("rms") unless explicitly stated otherwise. For example, 10,000 volts AC ("VAC") means 10,000 volts$_{RMS}$, AC. "AC" refers to "alternating current."

2. Introduction

Metals are typically slightly soluble in water. When dissolved in water, a metal, such as gold, exists as an ion. Furthermore, while larger particles of native metal will precipitate or settle out of water, some particles, known as colloidal particles, are held in suspension. In many instances it is desirable to remove ionic and colloidal metals from aqueous solutions. For example, in producing drinking water, it is desirable to remove metals because of the health risks associated with certain metals. Removing certain toxic metals from industrial waste before disposing into the environment may be required by regulation. Where significant volumes of aqueous solutions containing precious metals, such as gold or silver, are available, it is desirable to remove these metals for their intrinsic value.

Groundwater in regions containing gold-bearing ores often contain small concentrations of gold. Furthermore, gold is increasingly being used in the semiconductor industry. As aqueous wash solutions replace harsher, fluorine-based wash solutions, the semiconductor industry may become a source for significant volumes of gold-bearing aqueous solutions. One of the greatest sources of large volumes of water containing concentrations of metals, and particularly precious metals, is mines.

It is to be expressly understood that the apparatus and process of the present invention may be used to remove a wide range of metals from many types of solutions. However, the preferred embodiment will be described in the context of using the apparatus of the present invention to remove precious metals from groundwater removed from a mine, and particularly precious and base metals, since these have the greatest value.

3. Prior Art

There are many known processes for removing metals from an aqueous solution. However, these known processes become very inefficient and cease to be cost effective at low concentrations such as less than 50 ppm.

One such process, electrowinning, has long been used in conjunction with heap leach-carbon absorption methods for gold and silver mining. Electrowinning is a direct current (DC) electrolytic process involving low voltage and high current. When the electrowinning process is used with substantially pure water containing low concentrations of metals, the voltages required to attain the current flow required by electrowinning and necessary to accomplish plating increases dramatically, with as much as 150 or even 300 volts required. Hence, power consumption is also dramatically increased (with 150 volts and 25 amps constituting 3,750 watts). Furthermore, (as stated by Milligan at 145), the efficiency of the electrowinning process approaches zero at concentrations of gold less than 1 ppm. When considering the low efficiency (less than 10%) at low concentrations, the high power consumption (both at the electrodes and in converting AC voltage to DC voltage), and the cost of electrical power, the electrowinning process is not economically feasible where concentrations of gold (less than 50 ppm) and the conductivity of the solution are low.

4. Apparatus of Present Invention

A. Overview

The present invention provides a cost effective system and process for removing gold, silver, and other metals from aqueous solutions having low concentrations of these precious and base metals. The present invention consumes little electrical power to treat a relatively high flow of water containing as little as 2 parts per billion of a metal yet removing approximately 97% of the metal. This invention can be used with either direct or alternating current, although alternating current is preferred since conversion of readily available alternating current to direct current would involve a needless expense and energy loss. This invention does not require the use or addition of any harsh chemical additives to increase the conductivity of the water since it does not rely on high current flow. Since electrolytic additives are not required, the water can often be disposed without any further treatment directly into the environment. Furthermore, the apparatus of this invention can be inexpensively built with most components being available at local hardware stores, and can be assembled on a small trailer for easy transport between remote locations.

Figure 1:
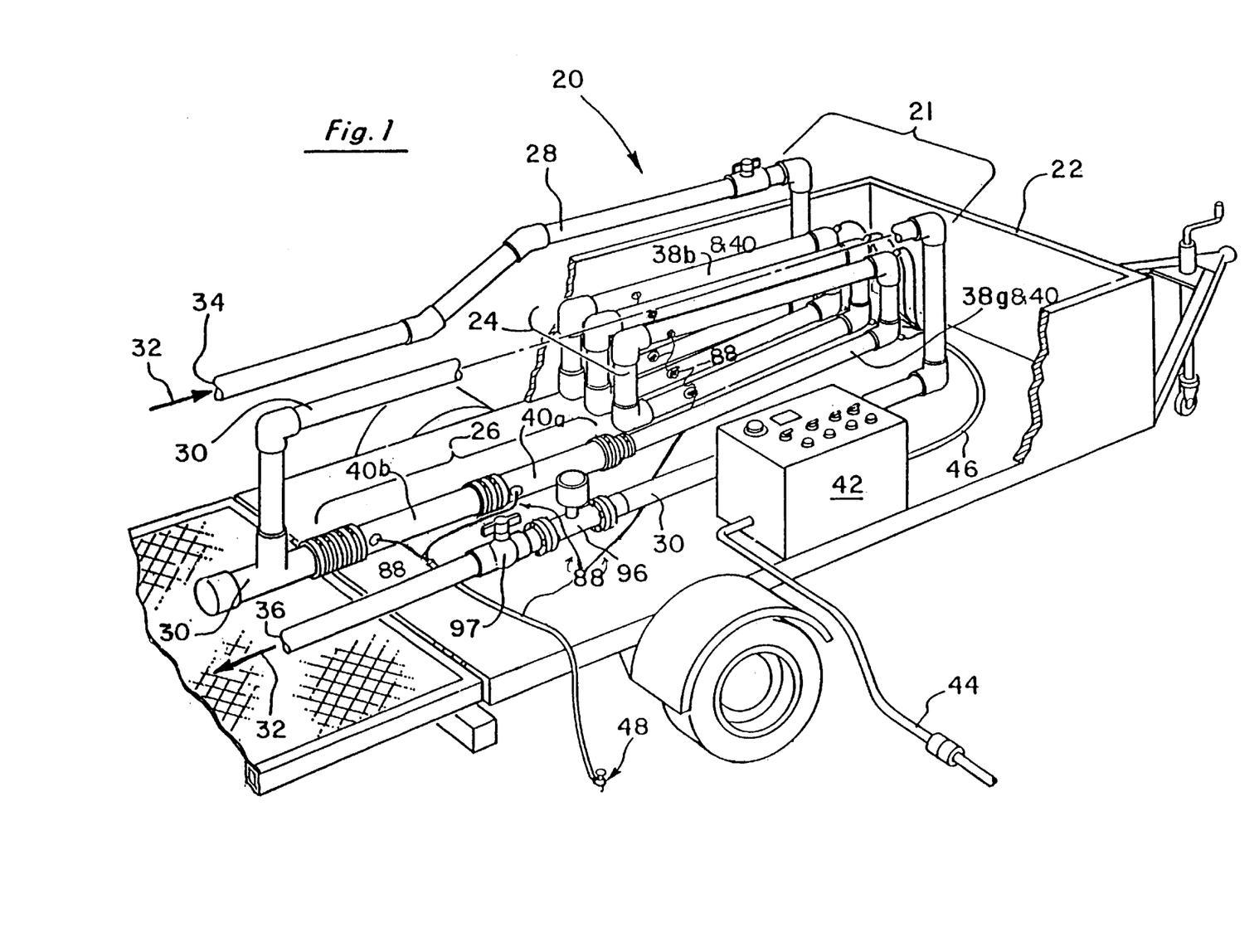
FIG. 1 shows a perspective view of the preferred embodiment of the apparatus of the present invention mounted on a portable trailer.

Referring now to FIG. 1, the preferred embodiment [20] of the system of the present invention is shown. The system [20] for removing metal from an aqueous solution can be portable, being mounted to the back of a small trailer [22]. The system [20] includes a feed pipe [28], electrode/ground cluster [24], with a stainless steel secondary ground/stage [26] (note: this stage is not required or essential), and exit pipe [30] to a filter system (not shown). Standard commercially available filter systems are used. The feed pipe [28], electrode/ground cluster [24], with secondary ground tubes, and exit pipe [30] are all interconnected in fluid communication to form a flow channel [21] for containing a directed flow [32] of the aqueous solution. The feed pipe [28] constitutes an upstream portion of the flow channel [21], and the exit pipe [30] constitutes a downstream portion of the flow channel [21]. The flow channel [21] has an entrance [34] at the upstream portion and exit [36] at the downstream portion for the directed flow [32]. The directed flow [32] can be provided by any conventional means such as a conventional pump (not shown) or simply by gravity from a source (not shown) above the system [20]. As mentioned above, the aqueous solution of the directed flow [32] may be provided from a variety of sources, including waste streams from industrial processes or mines. It is to be understood that the configuration of the flow channel [21] can be of any desired design.

B. Overview of the Electrical Environment

The electrode/ground cluster [24] includes seven electrode/ground chambers [38]. The electrode/ground chambers [38] at least periodically provide a high voltage electric field substantially parallel to the direction of the directed flow [32]. To accomplish this, the electrode/ground chambers [38] are connected to any conventional household voltage power sources, such as the voltage power source [42]. The secondary stainless steel [40], and the stainless steel tubes in the electrode/ground changers [38b] are connected to ground [48]. It is to be expressly understood that the voltage power source [42] is not to be considered an element of the system [20] of the present invention. The present invention merely interacts with a conventional system, the power source [42], to act on the directed flow [32] to achieve a desired result, the removal of metal via filteration using presently available systems from the directed flow [32]. Nevertheless, to understand how the present invention effects this result, it is necessary to understand the power requirement of the system [20] of the present invention.

Figure 8A:
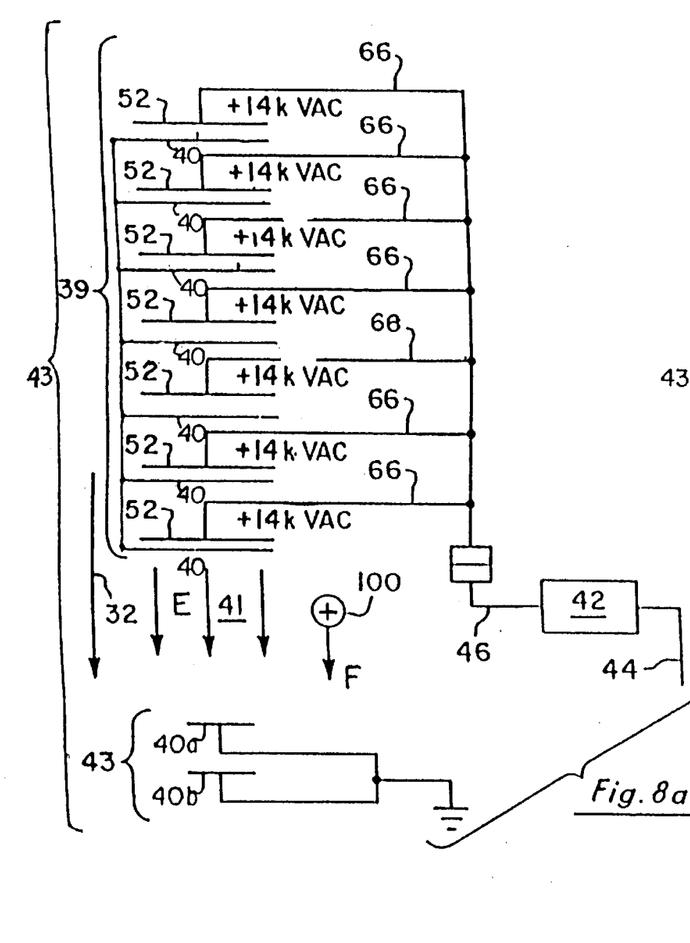
FIG. 8a is an illustration of the electrical field within the preferred embodiment shown in FIG. 1.
Figure 8B:
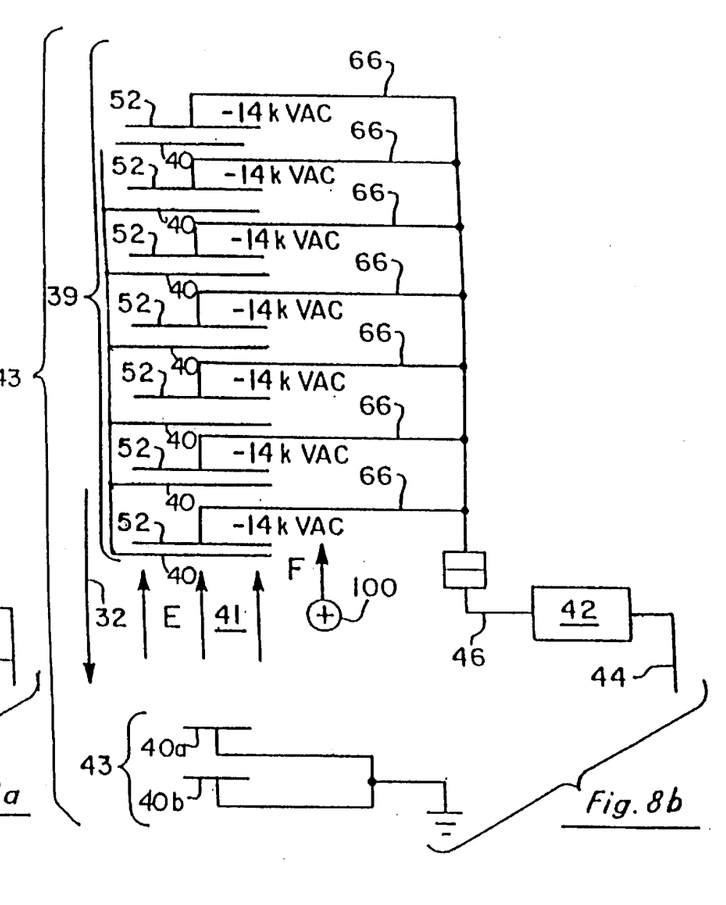
FIG. 8b is an illustration of the electric (or electrical like in 8a) field within the preferred embodiment shown in FIG. 1 when the electrode/ground chambers are negatively charged.
Figure 9:
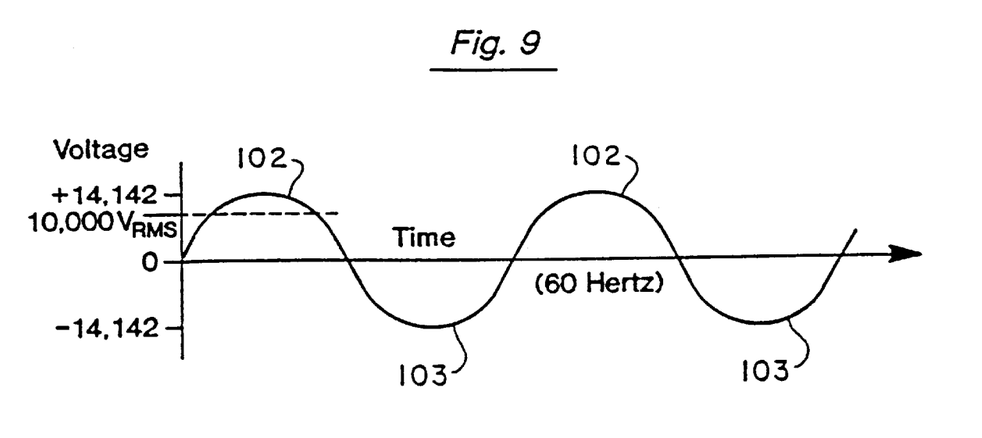
FIG. 9 is a graph of the preferred waveform of the voltage at each first electrode of the preferred embodiment shown in FIG. 1.

In using the preferred embodiment, [115] household to voltage (10,000 volts rms) AC power is preferred. Such power may be supplied by the voltage power source [42], which may contain transformers and other conventional components necessary to step up AC current at a lower voltage provided through input line [44] to provide 10,000 VAC at 60 Hz. through output line [46]. The input power provided through input line [44] can be single phase AC current provided by a variety of sources, including 115 VAC, 230 VAC, or 345 VAC utility power lines, or by a portable AC generator. When AC power is used, the electric field [41] within the directed flow [32] is only periodically (as shown in FIGS. 8a, 8b, and 9) favorably oriented when the electrodes 38 are positively charged with respect to the ground [48] (as shown in FIG. 8a). Direct current could also be used with the system [20].

Alternatively, it is anticipated that the ground in the electrode/ground chambers and the secondary grounds [40a] could be connected to one phase of a three phase AC power source, and the electrode in the electrode/ground chambers [38] to another phase, in which case the stainless steel ground [40a] would periodically have an instantaneous voltage less than zero. Also, higher or lower frequencies and/or higher or lower voltage could be used. As used herein, "voltage" refers to any voltage greater than 1000 volts, AC or DC. If DC power were used to positively charge the electrode/ground chambers [38], there would be the advantage of having a constant, favorably oriented electric field within the directed flow [32] parallel to the direction of the directed flow [32] (as shown in FIG. 8a). However, power would be lost in converting alternating current, which is readily available from utilities or portable generators, to direct current, and additional converters, hence increased capital costs, would be required.

C. The Electrode/Ground Chambers

Figure 2:
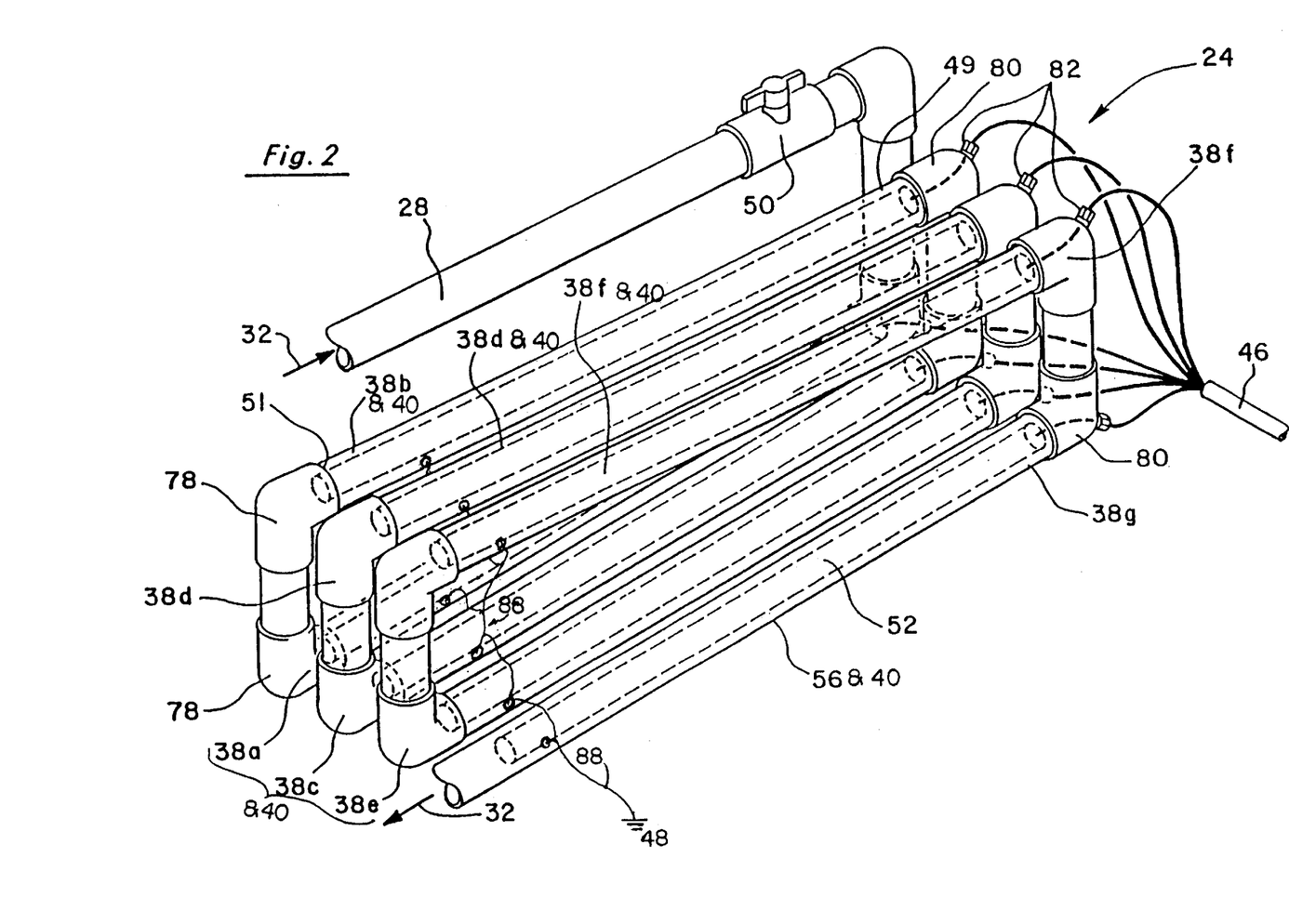
FIG. 2 shows a perspective view of a cluster of electrode/ground chambers of the preferred embodiment shown in FIG. 1.

The electrode/ground cluster [24] is more clearly shown in FIG. 2, and includes preferably seven serially connected electrode/ground chambers [38a–38g]. Each electrode/ground chamber has an inlet [49] and an outlet [51] (as shown on electrode chamber 38b). The inlet [49] of the first electrode/ground chamber [38a] is connected to the feed pipe [28]. A conventional cutoff valve [50] is provided for controlling the directed flow [32].

Figures 3, 4, 5:
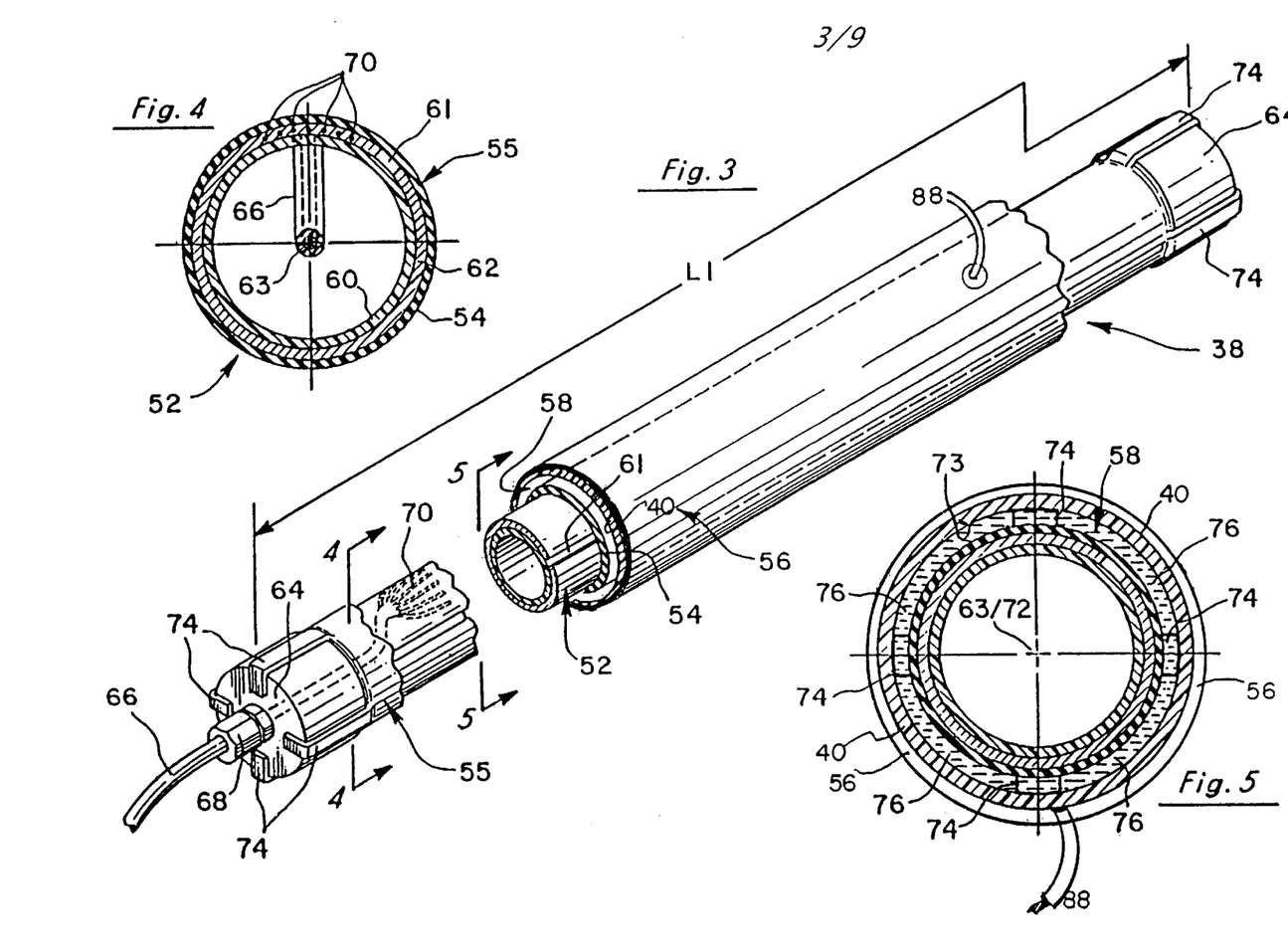
FIG. 3 shows a perspective, partially exploded view of an electrode/ground chamber of the cluster shown in FIG. 2.
FIG. 4 is a cross-sectional view of the first electrode/ground of the electrode/ground chamber shown in FIG. 3.
FIG. 5 is a cross-sectional view of the electrode/ground chamber shown in FIG. 3.

A single electrode/ground chamber [38] is shown in FIG. 3. Each electrode/ground chamber [38] includes a first electrode [52], a layer of electrically insulating material [54] encapsulating and deposited around the first electrode [52], and a hollow member [56] of electrically conductive material preferably a stainless steel tube [40] and surrounded by a hollow non-conductive member [56] of electrically insulating material [56] and the first electrode [52] forming a flow passageway [58] there between. Each first electrode [52] is shown positioned along the flow channel [21] (shown in FIG. 1), and in this embodiment, is also located within the flow channel [21]. The electrically conductive stainless steel member [40] is connected to the ground [48] via ground lead wires [88].

A cross-section of the first electrode [52] is shown in FIG. 4. The first electrode [52] of the preferred embodiment is made of a cylinder of a non-conducting material, such as a conventional two inch (inside diameter) PVC pipe [60], around which is wrapped a sheet of electrically conductive foil [62], such as copper or aluminum foil, or the tube can be sheathed with a copper or aluminum tube. The preferred aluminum or copper foil [62] is approximately 3 mm to 4 mm thick and has an adhesive backing. The actual thickness and the use of an adhesive are not considered critical to the present invention. It is anticipated that any electrical conductor could be used in place of the aluminum foil [62], such as gold leaf, copper foil, or a layer of an electrically conductive polymer. Copper tubes and aluminum tubes have also been used successfully.

The electrically insulating material [54] in the preferred embodiment is a heat shrinkable polymer manufactured by Raychem Corporation of Menlo Park, Calif. under the product name BPTM100/40 Bus Bar Insul Tubing 3.94-1.57 in. This material is a dielectric, having a high resistivity, and does not break down when exposed to high voltages and/or corrosive waters. The advantage of using this heat shrinkable material is that, when applied, it shrinks to form a water tight seal around the aluminum foil [62] to seal the first electrode [52] to prevent the aqueous solution from contacting the aluminum foil [62] or tube conductor.

Conventional endcaps [64] enclose each end of the pipe [60] of the first electrode [52]. A conventional electrically insulated wire [66] is inserted through one of the endcaps [64], and a conventional bulkhead fitting [68] is used to seal around the wire [66] and the inside cavity of the PVC pipe [60]. The insulation of the wire [66] is removed from the end of the wire [66] that is inserted through the endcap [64], and the conductor of the wire [60] is frayed [70] (as shown in FIG. 3). The frayed portion [70] of the wire [60] is placed against the aluminum foil or tube [62], and held in place by aluminum tape and/or the heat shrinkable, electrically insulating layer [54]. Hence, the wire [66] supplies high voltage to the first electrode [52] when connected to a power source. Thus assembled, the first electrode [52] is cylindrical in configuration, having a central axis [63] (shown in FIG. 4), a length [L1] of approximately 20+0.40 inches (excluding the endcaps [64]), a total outside diameter of nearly 2½ inches (including the layer [54] of insulating material and excluding the endcaps [64]), and an outer surface [55]. The length and diameter can be varied depending upon the flow volume through the hollow flow space [58].

It is anticipated that many other configurations for the first electrode [52] are possible, including the use of square plate members, as well as a single cylindrical conductor such as a single stainless steel, aluminum, or copper pipe in place of the PVC pipe [60] and the aluminum foil [62]. All of these, as well as other variations, are within the scope of the present invention.

As shown in FIGS. 3 and 5, the first electrode [52] is inserted into the hollow member [56] which, in the preferred embodiment, is a 2½ to 3 inch (inside diameter) stainless steel inside a PVC pipe. (Note: The stainless tube is grounded via a bolt of stainless steel and nut to a ground wire.) The hollow member [56] of the preferred embodiment is tubular in configuration and has a central axis [72] (shown in FIG. 5) and an inner surface [73]. As shown, each hollow member [56] has an inlet [49] and an outlet [51] for the directed flow [32].

It is desirable to have a means to center the first electrode [52] within the hollow member [56]. In this preferred embodiment, fingers (or set screws of nylon) [74] formed from the layer [54] of electrically insulating material to overlap the endcaps [64] are provided. These fingers [74] substantially center the first electrode [52] within the hollow member [56] so that the central axis [63] of the first electrode [52] is substantially aligned with the central axis [72] of the hollow member [56], as shown in FIG. 5. As shown in FIG. 5, the fingers [74] do not obstruct the flow passageway [58], as significant gaps [76] are present. Set screws of nylon can also be used. Thus assembled, the flow passageway [58] is small, with approximately ¼ to 1 inch clearance between the layer [54] of insulating material and the inner surface [73] of the hollow member [56]. Such a flow passageway [58] is desirable in order to expose the directed flow [32] to the strongest portion of the electrical field between the stainless steel lined PVC ground and the electrode.

Figures 11, 11A, 12:
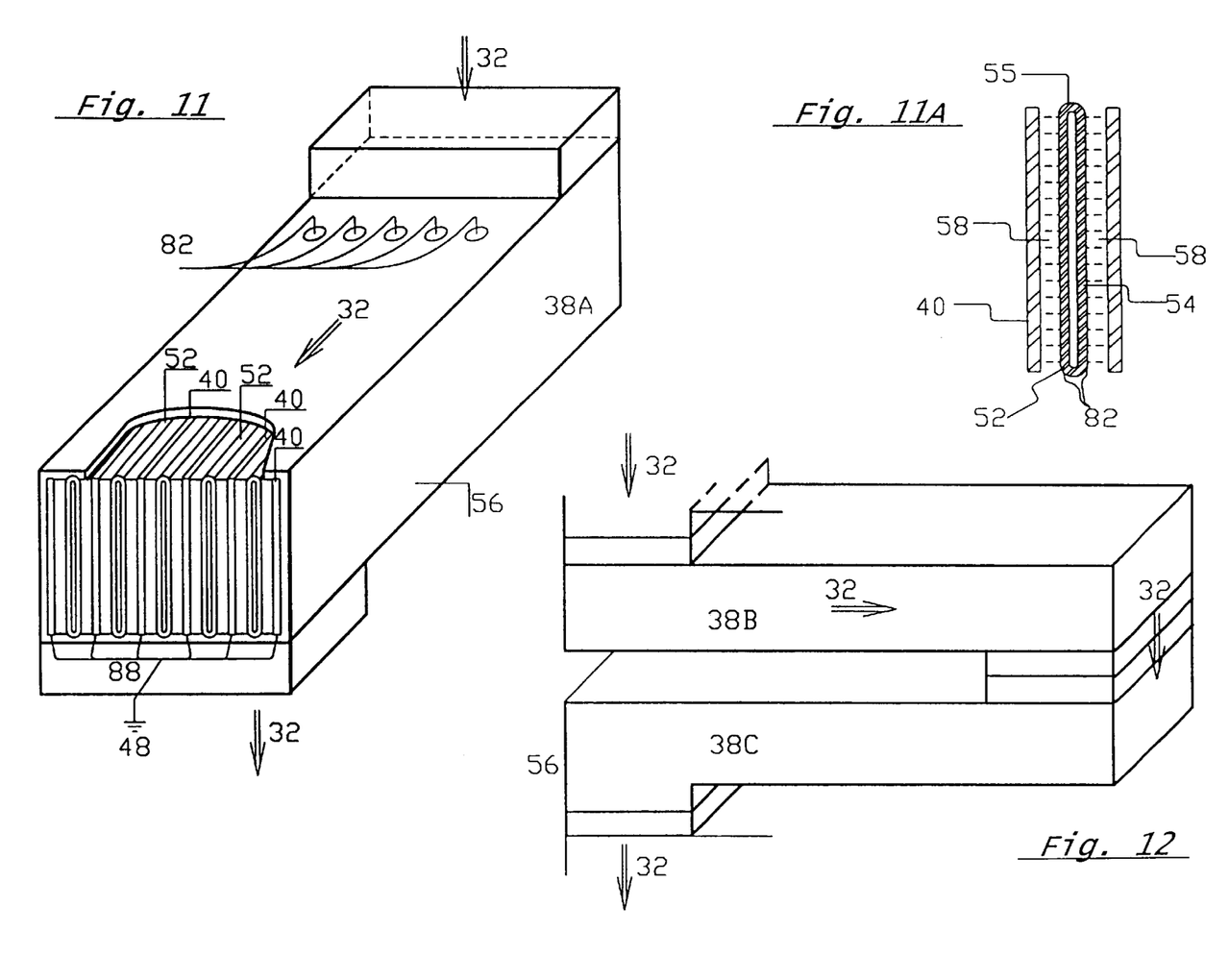
FIG. 11 is an alternative embodiment of a multiple electrode/ground chamber of the present invention.
FIG. 11a is a cross-sectional view of the alternative embodiment of the multiple electrode/ground chamber.
FIG. 12 is a diagram showing multiple electrode/ground chambers connected in solution flow path.

Electrodes can be made much larger in diameter if greater flow volume is desired, or a large cell of flat plates insulted, standing between grounded stainless plates in a large tank (see FIGS. 11 and 12).

Figures 6, 7:
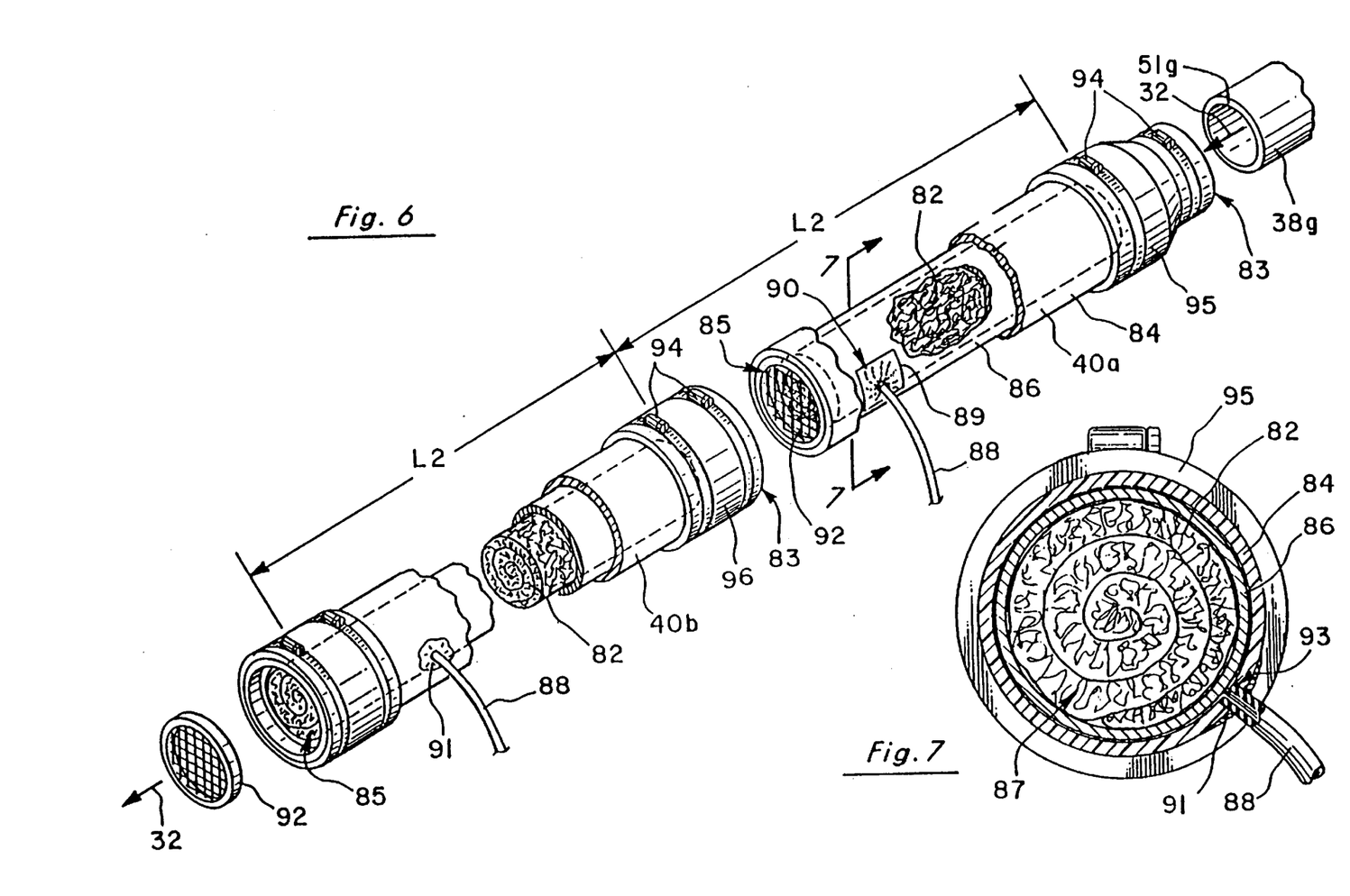
FIG. 6 is a partially exploded view of an additional grounded chamber that may be added to the preferred embodiment as per FIG. 1.
FIG. 7 is a cross-sectional view of the supplementary grounded chamber.

As shown in FIG. 2, each electrode/ground chamber [38] is connected in serial flow communication with the others to form an electrode/ground cluster [24] using conventional PVC elbows [78 and 80]. As shown in FIG. 2 at electrode/ground chamber [38g], the length of each hollow member [56] of each electrode chamber [38a–38g] is not significantly longer than the first electrode [52], although the actual length is not critical. The length of the hollow member [56] of electrode/ground chamber [38g] may be longer than the others in order to connect to the additional stainless steel ground [40a], discussed below. At elbows [80], a bulkhead connector [82] is used to bring the wire [66] (shown in FIG. 3) of each first electrode [52] from the inside of each electrode chamber [38] for connecting to the output line [46] (shown in FIG. 1) of the power source [42]. These may be placed at any convenient location along the cylinders. There is a stainless steel nut and bolt sealed in the outer tube of PVC lined with a stainless steel tube connected to a ground wire [88] to provide the main ground of the system D. The Secondary Stainless Steel Grounds Referring now to FIG. 6, two secondary grounds [40a and b] are shown. Each secondary ground [40a and 40b] has a grounded electrode [82], an inlet [83], and an outlet [85], and is in flow communication with the outlet [51g] of the electrode/ground chamber [38g], as shown in FIG. 6. As shown in FIG. 7, each secondary ground [40a and 40b] includes an outer PVC pipe [84], an inner stainless steel pipe [86], and a quantity of stainless steel wool [82] to serve as a grounded electrode between the inlet [83] and the outlet [85]. The outer PVC pipe [84] has an inside diameter of approximately 3 inches. The stainless steel pipe is not essential to the design. The stainless steel pipe [86] is sized to fit with close clearance inside the PVC pipe [84]. The stainless steel pipe [86], being tubular, defines an internal passageway [87]. The stainless steel wool [82] partially obstructs the internal passageway [87]. It can be used without the stainless steel pipe. The insulation of a ground wire [88] is removed and a portion of the conductor frayed to form a frayed portion [90]. The frayed portion [90] is attached to the outside of the stainless steel pipe or to the stainless steel wool [82] using a metallic tape [89]. The wire [88] passes through a hole [93] in the PVC pipe [84], and the hole [93] is sealed using an epoxy resin [91], as shown in FIGS. 6 and 7. The stainless steel wool [82] is held in place within the stainless steel pipe [86] by a plastic screen [92] at the outlet [85] of the secondary ground [40a], the screen [92] preventing the directed flow [32] from washing the stainless steel wool [82] out of the secondary ground [40a]. In the preferred embodiment, each secondary ground [40a and 40b] has length [L2] of approximately 2 feet. Only the primary ground is absolutely necessary in the electrode/ground chambers as shown in FIGS. 3, 4 and 5.

As shown in FIG. 6, the first secondary ground [40a] is connected in flow communication with the outlet [51g] of the electrode/ground chamber [38g] by a conventional step-down connector [95] and clamps [94]. Each ground pipe [40a] is connected to the other by conventional connector [96] and clamps [94]. The use of conventional clamps [94], which are shown as screw-type hose clamps, allows quick disassembly of the secondary stainless steel grounds [40a and 40b] for periodic removal and cleaning of the stainless steel wool [82]. As shown in FIG. 1, additional pipe sections can be added to the outlet [85] of the secondary ground [40b] to form an exit pipe [30] of the desired length. A flow meter [96] and a flow cutoff valve [97] may be mounted to the exit pipe [30] as shown.

Thus, the stainless steel wool [82] and stainless steel pipe [86] form a grounded secondary electrode located within the flow channel [21] between the first electrode/ground [52] and the downstream portion of the flow channel [21]. Since the stainless steel wool [82] is grounded, it has a voltage substantially equal to zero. The layer [54] of insulating material, being a dielectric, electrically isolates and separates the second electrode [82] from the first electrode/ground unit [52].

5. Use of the Preferred Embodiment of the System

To use the preferred embodiment [20] described above to remove metal from an aqueous solution, the high voltage power source [42] described above is provided. The wires [66] of each electrode/ground chamber [83] are connected to the output line [46] of the high voltage power source [42]. The wire [88] of each ground [40] is connected to the ground [48]. A directed flow [32] of an aqueous solution containing one or more particular metals, either in an ionic and/or colloidal state, is introduced into the feed pipe [28]. The system is not particularly selective, and will remove a substantial portion of all ionic metals or colloidal metals in the aqueous solution. Typically, the directed flow [32] is provided by a conventional pump, although gravitational flow could also be used. The directed flow [32] is contained by the flow channel [21] and is passed first through the seven electrode/ground chambers [38a–g] and then through the secondary stainless steel ground [40a–b] on into a filtratic system (not shown) of any design using at least carbon (activated or granulated). (Note: It is often useful to pass the water to be treated through some sort of sediment clarifier to remove the suspended material first. This makes the clear water treatment more efficient. The Lyntek Chevron Clarifier is recommended for this because of its efficiency).

When the system [20] is connected to the high voltage AC power source [42] and the ground [48, the first electrode [52] of each electrode/ground chamber has a RMS voltage of 10,000 volts, and periodically has a maximum positive instantaneous voltage of approximately 14,142 volts. In this state, the electrodes [52] and grounds [40, 40a & 40b] act essentially as a capacitor, with the directed flow [32] passing between the anode [39] and cathode [43] (as shown in the illustration of FIG. 8a). Because alternating current is used, the electrodes [52] also periodically have an instantaneous negative voltage (illustrated in FIG. 9 portion 103). As illustrated in FIG. 8a, when the instantaneous voltage of each first electrode [52] of each electrode chamber [38] is greater than zero and with the ground [40] having a voltage substantially equal to zero, the electric field [E] [41] between the first electrodes [52] and the grounded stainless steel tubes [40] and secondary grounded steel wool [82] is substantially parallel to, and in the direction of the directed flow [32]. In this state, due to well-known physical phenomenon, a force [F] will be exerted on a positively charged metallic particle [100] in the directed flow [32]. This force [F] will urge such particles [100] to form on the filters after the grounded secondary stainless steel wool [82], or after the electrode/ground chambers [39]. When the instantaneous voltage of the first electrodes [52] falls below zero (as shown by portion 103 in FIG. 9), the direction of the electric field [E] [41] will reverse as shown in FIG. 8b; in this state, the force [F] will not urge the positively charged particles [100] toward the ground or secondary grounded stainless steel wool [82]. Furthermore, the force [F] is not sufficient to remove those particles already deposited on the carbon and/or resin filters. However, it is only the positive voltage portion [102] of the waveform (shown in FIG. 9) that is thought to be useful in encouraging positively-charged metallic particles [100] to be formed and deposited after the stainless steel wool [82] on the filters.

When the directed flow [32] is passed through the system [20] as described above, the metals are deposited at the filters after the secondary grounds [40] or the electrode/ground chambers [39].

The metal, however, does not plate, but instead, is deposited as native metal, such as native gold, as a metalliferous sludge-like material. Once sufficient time has passed for the filters to become saturated with metal, the filters are back flushed and the sludge collected or the filters are replaced. The filters may be stripped using standard technology or sent to a refiner for further processing.

The effect of high voltage fields on metallic ions and colloidal metals is not well understood. Although the applicant has not developed the electromagnetic theory of operation, it is believed that the electrical force [F] described above is partially responsible for urging the positively charged metallic particles, both ionic and colloidal particles, onto the filters. However, it is also believed that the metal contained in the aqueous solution may undergo electrical and/or chemical changes when passing in close proximity to the first electrode/ground [52/40] in the flow passageway [58]. It may be possible through some as yet undiscovered phenomenon that the metallic ions, while already possessing a positive charge, become more positively charged after passing the first electrode/ground [52/40]. It is also believed the colloidal metallic particles in the directed flow [32] that may be neutral before passing the electrode/ground chambers [39] obtain a positive charge from the first electrode/ground [52/40]. Also, it is believed that any positive charge that such colloidal particles may have had before passing through the electrode/ground chamber [39] is enhanced by the first electrode/ground [52]. Whatever the actual theory of operation, the structure described above causes the removal of a substantial portion of the metal or metals in the directed flow [32] after the electrode/ground chambers [52/40] or secondary ground [40a & 40b].

Although not critical, the distance between the last first electrode [52] and the steel tube [40] should be minimized because the electric field [E] [41], and therefore the force [F] on the particle [100], diminishes as distance between the electrode/ground chambers and secondary steel wool [82] and the first electrode [52/40] increases. In the preferred embodiment, there is a minimized distance between the fist electrode/ground chamber [52g/40] of the last electrode/ground chamber [38g] and the closest point on the stainless steel wool [82] of the secondary ground [40a] is approximately eighteen inches. However, using 10,000 volts AC, it has been calculated that the system [20] would be effective with this distance being as much as six feet. (Again, the secondary ground system is supplementary and not essential).

In addition to the design of the electrical components described above, part of the success of this system [20] is due to its unique flow characteristics. If too great a flow is present, the metal would not form at the filters because the fluidic force of the directed flow [32] would exceed the electrical forces acting on the charged particles [100] at the filters, so the metal would be washed off the filters. Also, turbulence within the flow channel [21], enhances the exposure, but too much turbulence tends to wash the collected metal from the filters. Therefore, it is desirable to minimize high pressure turbulence, which increases with flow rate. However, but for the increase in turbulence, it would be desirable to maximize the flow rate because the power consumed in maintaining the high voltage at the first electrodes [52] is approximately fixed regardless of the flow rate. These countervailing factors must be weighed to arrive at an optimum flow rate to achieve maximum collection efficiency for the electrical power consumed. With this system [20], it is believed that the optimum flow rate for the directed flow [32] is approximately 7 to 15 gallons per minute (GPM), although it is also believed that flow rates as high as 60 GPM could be used without significantly reducing efficiency for the design of this system [20].

6. Preferred Embodiment of the Process

Figure 10:
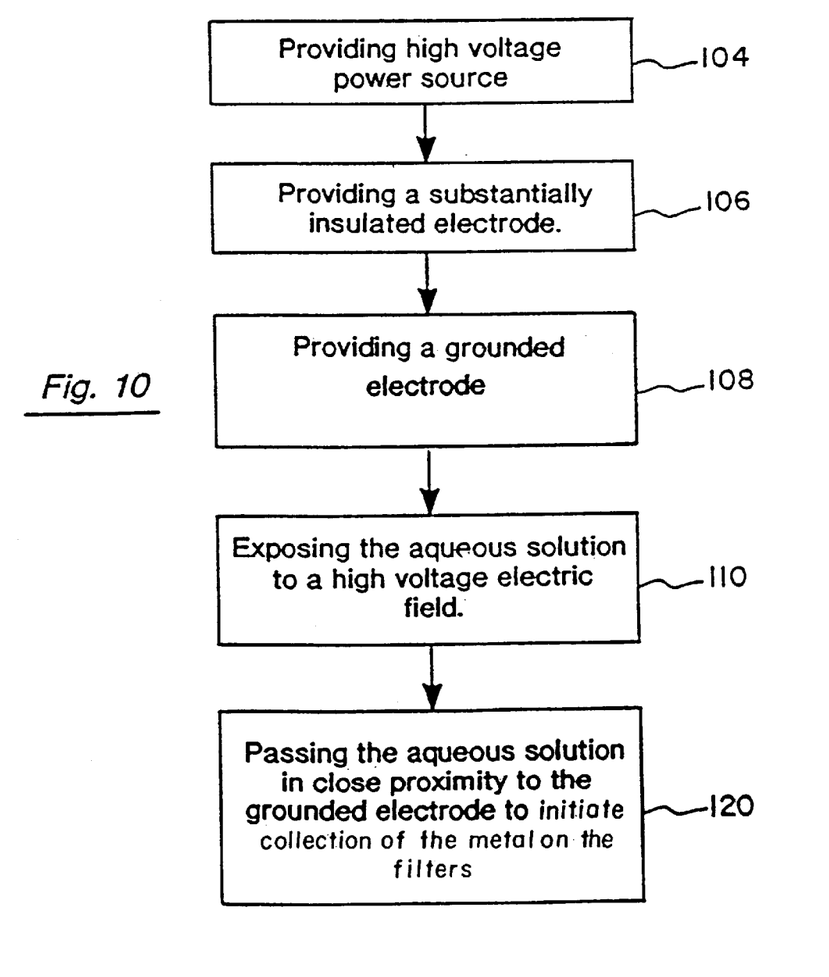
FIG. 10 is a diagram of the preferred embodiment of the process of the present invention.

The present invention also includes a process for removing metal from an aqueous solution. The preferred embodiment of the process of the present invention is illustrated in FIG. 10, and includes the step of providing [104] a high voltage power source such as the high voltage power source [42]. The process further includes the step of providing [106] a substantially insulated electrode such as the first electrode [52] of the electrode/ground chamber [38] described above with the electrode connected to the high voltage power source. Furthermore, in the preferred embodiment, the process further includes providing an exterior hollow grounded member around the substantially insulated electrode such as the hollow member [56] described above includes a ground tube electrode. The process further includes providing [108] a secondary grounded electrode after which filters collect the metal. The grounded electrode is preferably the stainless steel tube described above, and is in flow communication with the substantially insulated electrode, preferably as described in the system [20] above. Obviously, there is no particular order required for the above steps [104, 106, 108]. The process next includes the step of exposing [110] the aqueous solution to a high voltage electric field by passing the aqueous solution in close proximity to the substantially insulated electrode connected to the high voltage power source (as provided in steps 104, 106, and 108) by flowing the aqueous solution through the grounded stainless steel exterior hollow member surrounded by a PVC insulating pipe. Once the aqueous solution is exposed to the high voltage electrical field, the process next includes passing [120] the aqueous solution in close proximity to the secondary grounded electrode and on to filters to collect the metal at a carbon and/or resin filter. A sand filter is used to remove any remaining suspended material. Supplementary chemical treatment can be used to remove additional quantities of metals, such as zinc. Recommended additives to the inflow source are one of the following chemicals: ferrous sulfate, cupric chloride, lanthanum chloride, gold tetra-chloride or silver chloride. These are not usually necessary, but can be useful depending upon the water chemistry.

7. Alternative Embodiments

A. Alternate Supplementary Ground Designs

The secondary grounded electrode or electrically conductive material of the secondary grounds of the present invention is not required to be stainless steel wool [82], but can be any conductive material. However, stainless steel wool has long been used in the electrowinning process described above because it has a large surface area for a given volume. For this reason, it is also desirable to use stainless steel wool [82] in the secondary ground [40a & 40b] of the present invention.

It has been found that using a stainless steel wool plated with a particular metal enhances the recovery of that particular metal. Hence, the process can be made somewhat selective by using a plated stainless steel wool or by the above recommended chemical additives. For instance, if the aqueous solution contains various dissolved metals such as zinc, cadmium, silver, and gold, and it is desired to remove primarily gold, then a stainless steel wool plated with gold would be used to more selectively remove primarily gold, although the other metals would also be recovered at the filters.

Similarly, where gold is the preferred metal to be recovered, the efficiency of the system [20] is enhanced when a solution in which gold tetra-chloride has been dissolved in first run through the system [20] to coat the unplated stainless steel wool [82] with a small amount of gold. Then, the directed flow [32] of aqueous solution that may contain a lesser concentration of gold than the gold tetra-chloride solution is then processed.

B. Alternative System Designs

It is further anticipated that systems larger than the preferred embodiment system [20] could be constructed. For example, it is anticipated that a system having four electrode/ground clusters [24] will be constructed with each electrode/ground cluster [24] fluidly connected in parallel with 25 GPM running through each cluster [24] to provide a total capacity of 100 GPM.

An alternative embodiment for large flow volumes is shown on FIGS. 11, 11a and 12 of the present invention for removing metal from an aqueous solution. There is a directed flow [32] flowing into a rectangular box shaped container [38a] having an entrance [34] and an exit [36] for the directed flow. The container surrounds an interior volume [58] into which the directed flow of aqueous solution is introduced.

The alternative embodiment system FIG. 12 [38a] has electrodes of copper plates [52] covered with the dielectric shrink tubing [54] connected to the power source [82]. Each copper plate is rectangular in shape having a minimum width, and length and being at least one sixteenth of an inch thick. Each electrode [52] alternates with a stainless steel plate [40] as a ground electrode connected to the ground [48] via wire connection [88]. There is a flow space volume [58] between the copper plate electrodes [52] and the grounds [40]. There are a minimum number of alternating copper plate electrodes [52] and stainless steel plate grounds [40]. Usually this number will be five electrodes [52] and six grounds [40]. The number can vary being lower with one electrode and two grounds up to at least ten electrodes and eleven grounds. The space [58] between each electrode and ground is not critical, however, less than one inch has proven to be effective [11a]. There can be several of these flow box [38a, 38b, and 38c] containers connected together [FIG. 12]. The determining factor is the flow volume required and the time of flow. This embodiment is designed to carry a minimum flow of 100 gallons per minute. The flow directed along leads [32] to commercially available filter systems which then cause the metal ions to deposit upon the filter media [not shown].

Figure 13:
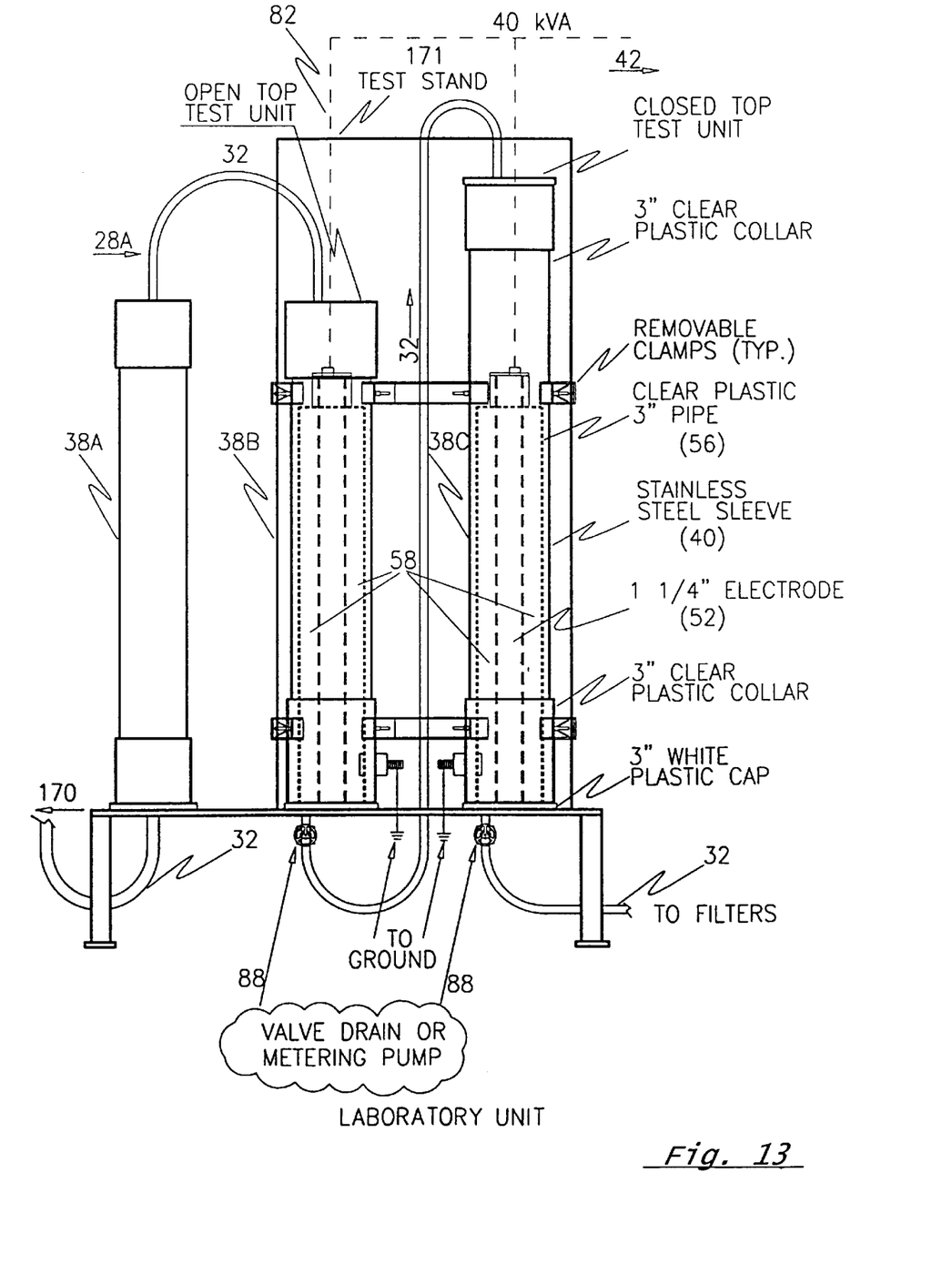
FIG. 13 is an alternative embodiment of an electrode/ground chamber system for laboratory use of the present invention.

A laboratory test unit which is an alternative embodiment of the present invention [FIG. 13] for removing metal from an aqueous solution uses one or more of the electrode chambers described in the preferred embodiment of the present invention. On FIG. 13 there are 3 of the electrode chambers connected in direct flow from a metering pump [170] which pumps a test sample of the aqueous solution into the first electrode/ground chamber [38a] it then moves through electrode/ground chambers [38b and 38c] discharging into filter chambers [not shown]. The filter chambers can be any size or shape, custom made or commercially available. The electrode/ground chambers are identical to those described in the preferred embodiment. They differ only in they are connected via plastic tubing of low flow volume [28a]. Each electrode chamber consists of an electrode [52] surrounded by a flow space [58] and a stainless steel tube acting as a ground [40] encased in a plastic pipe [56]. The electrode/ground chamber may be sealed as in [38a and 38c] or open at the top as in [38b]. Each electrode is clamped to a stand for convenience, the stand [171] can be any shape or size to hold as many electrodes and filter containers as desired. The stand and the metering pump are not a part of the present invention. Each electrode in the electrode chamber is connected to a power source [42] via high voltage power line [82]. Each stainless steel tube is connected to the ground [48] by a ground wire [88].

The power source is as described in the preferred embodiment of the present invention. However, it is designed using commercially available amperage control and gauges. The flow volume is designed to be between one-tenth of a gallon per minute and one gallon per minute. The flow is through one or more electrode/ground chamber [38a, 38b, and 38c], then directly into a filter system of granulated carbon, activated carbon, resins such as manganese dioxide or green sands, and finally into a clean sand filter. Any or all of the above may be used or any other filter type designed to catch a particular metal colloid or ion. Although the illustrated alternative to the present invention uses clear plastic pipe as shown in FIG. 13, any type of PVC pipe may be used in this embodiment of the present invention. The size is not critical (3 inch electrode/ground chambers were constructed in FIG. 13), however, they could be made larger or smaller in diameter as needed.

Figure 14:
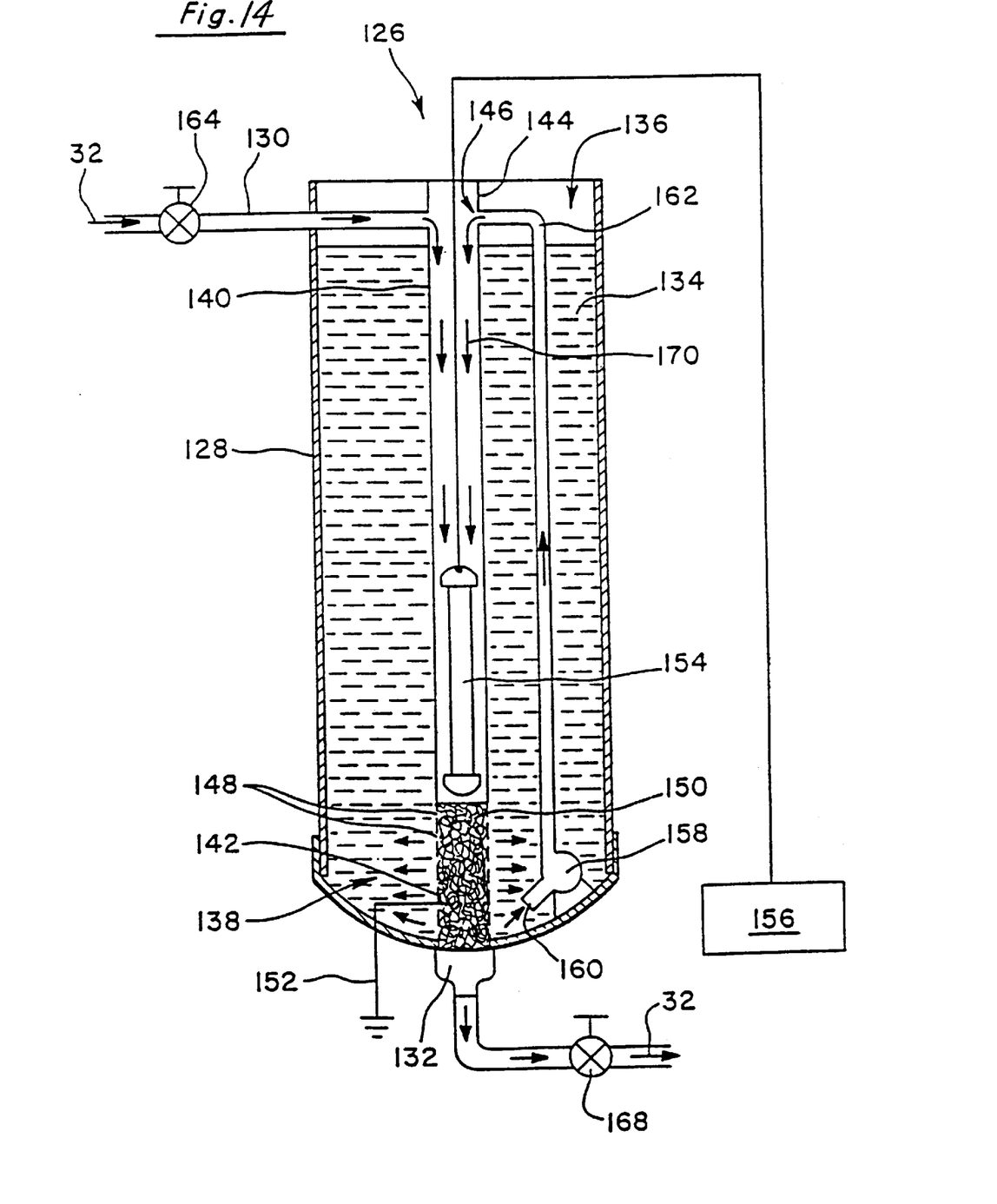
FIG. 14 is an alternative embodiment of the apparatus of the present invention.

An alternative embodiment [126] of the system of the present invention for removing metal from an aqueous solution is shown in FIG. 14, which shows the directed flow [32] flowing into a container [128] having an entrance [130] and an exit [132] for the directed flow [32]. The container [128] surrounds an interior volume [134] into which the directed flow [32] of aqueous solution is introduced. The container [128] has a top portion [136] and a bottom portion [138].

The alternative embodiment system [126] also has an elongated pipe [140] mounted in the container [128]. The elongated pipe [140] has a bottom end [142] located near the bottom portion [138], and a top end [144] located near the top portion [136] of the container [128]. The elongated pipe [140] has an entrance [146] near the top end [144], and an exit [148] near the bottom end [142]. The exit [148] of the pipe [140] is in flow communication with the bottom portion [138] of the container [128]. There can be several of these set in a given tank or container.

This system [126] also has a metallic obstruction [150], which is preferably stainless steel wool, near the bottom end [142] of the pipe thereby partially blocking the interior of the pipe. The metallic obstruction [150] is grounded [152]. The system [126] further has an elongated electrode [154] encapsulated by an electrically insulating material for connecting to a high voltage power source [156]. The first electrode [52] and the power source [42] of the preferred embodiment system [20] described above could be used with this alternative embodiment system [126]. The elongated electrode [154] is mounted within the elongated pipe [140] and above the metallic obstruction [150]. The system [126] further includes a circulating pump [158] having an intake [160] located near the bottom portion [138] of the container [128], and a discharge [162] in fluid communication with the top end [144] of the elongated pipe [140]. The system [126] further includes an entry valve [164] and an exhaust valve [168].

C. Alternative Embodiments of the Process

An alternative embodiment of the process of the present invention includes the use of the alternative embodiment [126] of the system of the present invention as follows. In using the alternative embodiment system [126], the exhaust valve [168] is closed, and the entry valve [164] is opened to allow a quantity of the aqueous solution to flow into the container [128]. The container [128] is filled with the aqueous solution until its level reaches the top portion [136]. Then, the entry valve [164] is closed. The aqueous solution is then circulated by the circulating pump [158] through the elongated pipe [140], the circulating pump [158] causing a directed flow [170] of the aqueous solution to flow first in close proximity to the electrode [154], and then in close proximity to a grounded conductor, the metallic obstruction [150]. The metallic obstruction [150] is connected to ground [152], so an electrical field exists within the elongated pipe [140] in a direction parallel to the direction of the directed flow [170] toward the grounded metallic obstruction [150]. As described above in connection with the preferred embodiment system [20], the metal in the directed flow [170] is deposited in filters placed after the metallic obstruction [150]. After a sufficient amount of time has passed to allow a portion of the metal in the quantity of aqueous solution held in the container [128] to deposit at the filters [150], the recycled water is discharged. When the filters (not shown) have collected an amount of metal, the filters are removed and either cleaned or replaced. After exhausting the treated quantity of aqueous solution, the exhaust valve [168] is closed, and the process may be repeated.

8. Conclusion

It should be understood that the particular embodiments shown in the drawings and described within this specification are for the purpose of example and should not be construed to limit the invention that will be described in the claims below. Now that a number of examples of the apparatus and process of the present invention have been given, numerous other applications should be evident to one skilled in the art. Further, it is evident that those skilled in the art may now make numerous uses and modifications of the specific embodiments described without departing from the inventive concepts disclosed herein. It should be obvious that the various members described may be made from a variety of materials and using a wide combination of dimensions. Consequently, the invention is to be construed as embracing each and every novel feature and novel combination of the features present in order possessed by the apparatus and process described herein.

What is claimed is:

1. A system for removing a metal from an aqueous solution, comprising:
   a flow channel having an upstream portion and a downstream portion, said upstream portion being adapted to receive said flow of said aqueous solution, said downstream portion including an exit for the flow of said aqueous solution;
   a first electrode configured to have at least periodically a high positive voltage, said first electrode positioned along said flow channel;
   a second electrode located within said flow channel and adapted to contact said flow of said aqueous solution, said second electrode located along said flow channel between said first electrode and said downstream portion of said flow channel, said second electrode configured to have a voltage less than said high positive voltage when said first electrode has said high positive voltage;
   a dielectric separating said first and second electrodes from each other and adapted to electrically insulate the flow of aqueous solution from the first electrode; and
   a filter positioned downstream from the second electrode and adapted to collect and remove the metal from the aqueous solution after the aqueous solution has flowed past the second electrode.

2. The system of claim 1, wherein said first electrode has high alternating voltage of at least 1000 volts.

3. The system of claim 1, wherein said first electrode has a substantially constant positive voltage of a least 1000 volts.

4. A system for removing a metal from an aqueous solution containing said metal, said system comprising at least one electrode/ground chamber having:
   a first electrode;
   a layer of an electrically insulating material encapsulating said first electrode;
   a grounded hollow member set apart from said layer to form a flow passageway between said grounded hollow member and said layer, said grounded hollow member having an inlet and an outlet for said aqueous solution and being configured to conduct a flow of the aqueous solution throughout the flow passageway in electrical contact with the hollow grounded member, but not in electrical contact with the first electrode;
   a power source connected electrically to the first electrode and to the grounded hollow member and adapted to provide a high voltage electric field (greater than 1,000 volts) across the aqueous solution when the aqueous solution flows through the flow passageway; and
   a filter downstream from the grounded hollow cathode adapted to collect and remove the metal from the flow of aqueous solution after the flow of aqueous solution has been exposed to the high voltage electric field in the flow passageway.

5. The system of claim 4, wherein said first electrode is cylindrical in configuration.

6. The system of claim 4, wherein said grounded hollow member is tubular in configuration.

7. The system of claim 4, including an electrically conductive material partially obstructing said flow passageway.

8. The system of claim 7, wherein said electrically conductive material partially obstructing said flow passageway is metallic wool.

9. The system of claim 8, wherein said metallic wool is steel wool.

10. A system for removing a metal from an aqueous solution containing said metal, said system comprising at least one multiple electrode/ground chamber having:
    an electrode and at least one ground plate disposed in a flow passageway, which is configured to conduct a flow of the aqueous solution between the electrode and the ground plate;
    a layer of an electrically insulating material encapsulating said electrode in a manner that prevents electric conduction between the electrode and the aqueous solution;
    a high voltage source (greater than 1,000 volts) connected electrically to the electrode and to the ground plate and adapted to expose said flow of aqueous solution through said flow passageway to a high voltage electric field (greater than 1,000 volts); and
    a filter positioned downstream from the electrode and ground plate and adapted to collected and remove the metal from the aqueous solution after the metal has been exposed to the high voltage electric field.

11. The system of claim 10, wherein said ground plate and said electrode encapsulated in said electrically insulating material are configured to form at least one hollow passageway between the ground plate and the electrode encapsulated with the electrically insulating material to form said flow passageway.

12. The system of claim 10, wherein said electrode and said ground plate are each in a rectangular configuration.

13. A process for removing metal from an aqueous solution, said process including:
    providing a high voltage (greater than 1,000 volts) power source;
    providing a substantially insulated electrode connected to said high voltage power source;
    providing a grounded electrode in spaced-apart relation with said substantially insulated electrode;
    exposing said aqueous solution to a high voltage electric field (greater than 1,000 volts) by passing said aqueous solution between said substantially insulated electrode and said grounded electrode; and
    collecting said metal in a filter positioned downstream from substantially insulated electrode and said grounded electrode.

14. The process of claim 13, further including:
    providing a container to surround said substantially insulated electrode and said grounded electrode;
    introducing a quantity of said aqueous solution containing the metal into said tank;
    circulating said quantity of aqueous solution between said substantially insulated electrode and said grounded electrode; and
    discharging said quantity of aqueous solution from said tank into at least one filter that is configured to collect and retain said metal.

15. A process for removing metal from an aqueous solution that contains ionic and/or colloidal forms of the metal dissolved in the aqueous solution, the process comprising:
    flowing the aqueous solution between two electrodes that have a high voltage (greater than 1,000 volts) electric field between them, where at least one of the electrodes is insulated electrically from the aqueous solution; and
    flowing the aqueous solution through a filter that is not in the high voltage electric field and is configured to absorb and remove the metal from the aqueous solution after the aqueous solution has been exposed to the high voltage electric field.

* * * * *